US010143964B2

(12) United States Patent
Kawamura et al.

(10) Patent No.: US 10,143,964 B2
(45) Date of Patent: Dec. 4, 2018

(54) VACUUM PUMP WITH ABATEMENT FUNCTION

(71) Applicant: EBARA CORPORATION, Tokyo (JP)

(72) Inventors: Kohtaro Kawamura, Tokyo (JP); Toyoji Shinohara, Tokyo (JP); Tetsuro Sugiura, Tokyo (JP); Hideo Arai, Tokyo (JP); Takashi Kyotani, Tokyo (JP); Toshiharu Nakazawa, Tokyo (JP); Keiichi Ishikawa, Tokyo (JP); Seiji Kashiwagi, Tokyo (JP); Yasuhiko Suzuki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 360 days.

(21) Appl. No.: 14/284,305

(22) Filed: May 21, 2014

(65) Prior Publication Data
US 2014/0348717 A1    Nov. 27, 2014

(30) Foreign Application Priority Data

May 24, 2013  (JP) ................................. 2013-109907

(51) Int. Cl.
*B01D 53/74*  (2006.01)
*B01D 53/70*  (2006.01)
(Continued)

(52) U.S. Cl.
CPC ............. *B01D 53/70* (2013.01); *B01D 53/74* (2013.01); *B01D 53/8662* (2013.01);
(Continued)

(58) Field of Classification Search
CPC .......... B01D 2251/30; B01D 2252/103; B01D 2253/102; B01D 2253/108;
(Continued)

(56) References Cited

U.S. PATENT DOCUMENTS

| 5,769,626 A * | 6/1998 | Hauff .................... B01D 53/00 417/201 |
| 2005/0135984 A1 * | 6/2005 | Ferron .................. B01D 53/34 423/245.3 |

(Continued)

FOREIGN PATENT DOCUMENTS

| EP | 1553303 A2 | 7/2005 |
| JP | S64-053075 A | 3/1989 |

(Continued)

OTHER PUBLICATIONS

English translation of JP 2004200364.*
European Application No. 14169139.4; Extended European Search Report; dated Nov. 11, 2014; 6 pages.

*Primary Examiner* — Dominick L Plakkoottam
(74) *Attorney, Agent, or Firm* — Baker & Hostetler LLP (57) ABSTRACT

A vacuum pump with abatement function is used for evacuating a chamber of a manufacturing apparatus. The vacuum pump with abatement function includes a vacuum pump having a discharge port to which at least one abatement part for treating an exhaust gas discharged from the vacuum pump to make the exhaust gas harmless is attached. The abatement part is selected from a plurality of abatement parts having different treatment types of exhaust gas and/or different treatment amounts of exhaust gas and/or different treatment performances of exhaust gas.

7 Claims, 8 Drawing Sheets

(51) Int. Cl.
  *B01D 53/92* (2006.01)
  *F04B 37/06* (2006.01)
  *F04B 37/14* (2006.01)
  *B01D 53/04* (2006.01)
  *B01D 53/68* (2006.01)
  *B01D 53/86* (2006.01)

(52) U.S. Cl.
  CPC ............ *B01D 53/92* (2013.01); *F04B 37/06* (2013.01); *F04B 37/14* (2013.01); *B01D 53/0438* (2013.01); *B01D 53/685* (2013.01); *B01D 53/8659* (2013.01); *B01D 2251/30* (2013.01); *B01D 2252/103* (2013.01); *B01D 2253/102* (2013.01); *B01D 2253/108* (2013.01); *B01D 2253/1124* (2013.01); *B01D 2253/206* (2013.01); *B01D 2255/10* (2013.01); *B01D 2257/204* (2013.01); *B01D 2257/2025* (2013.01); *B01D 2257/2042* (2013.01); *B01D 2257/2045* (2013.01); *B01D 2257/553* (2013.01); *B01D 2257/556* (2013.01); *B01D 2258/0216* (2013.01); *B01D 2259/818* (2013.01)

(58) Field of Classification Search
  CPC ...... B01D 2253/1124; B01D 2253/206; B01D 2255/10; B01D 2257/2025; B01D 2257/204; B01D 2257/2042; B01D 2257/2045; B01D 2257/553; B01D 2257/556; B01D 2258/0216; B01D 53/00; B01D 53/005; B01D 53/74; F23J 15/006; F23J 2217/50; Y02E 20/328; Y02E 20/363
  See application file for complete search history.

(56) References Cited

U.S. PATENT DOCUMENTS

| | | | |
|---|---|---|---|
| 2005/0142010 A1* | 6/2005 | Bailey | C23C 16/4412 417/423.5 |
| 2005/0177273 A1* | 8/2005 | Miyazaki | B24B 37/04 700/231 |
| 2006/0130649 A1* | 6/2006 | Jain | B01D 53/025 95/82 |
| 2006/0210405 A1* | 9/2006 | Fuksa | B01D 3/085 417/306 |
| 2008/0262655 A1* | 10/2008 | Smith | G05B 19/4185 700/247 |
| 2008/0289167 A1* | 11/2008 | Chandler | G05B 19/4184 29/428 |
| 2010/0071548 A1* | 3/2010 | Smith | B01D 53/32 95/3 |
| 2011/0131990 A1* | 6/2011 | Cataldo | F23G 5/006 60/643 |
| 2012/0090338 A1* | 4/2012 | Czerniak | B01D 53/79 62/91 |
| 2014/0106282 A1* | 4/2014 | Kim | F23G 7/065 431/5 |
| 2014/0352820 A1* | 12/2014 | Nakazawa | C23C 16/4408 137/565.01 |

FOREIGN PATENT DOCUMENTS

| | | | |
|---|---|---|---|
| JP | 08-299784 A | | 11/1996 |
| JP | 3305566 B2 | | 5/2002 |
| JP | 2004200364 A | * | 7/2004 |
| TW | 353766 B | | 3/1999 |
| TW | 463257 | | 11/2001 |
| TW | I361102 B | | 4/2012 |
| WO | WO 2004/041415 A1 | | 5/2004 |
| WO | WO 2010/092365 A1 | | 8/2010 |

* cited by examiner

VACUUM PUMP WITH ABATEMENT FUNCTION

CROSS REFERENCE TO RELATED APPLICATION

This application claims priority to Japanese Patent Application No. 2013-109907 filed May 24, 2013, the entire contents of which are hereby incorporated by reference.

BACKGROUND

In a manufacturing process for manufacturing semiconductor devices, liquid crystal panels, LEDs, solar cells or the like, a process gas is introduced into a process chamber which is being evacuated to perform various processes such as an etching process, a CVD process or the like. The process chamber for performing various processes such as an etching process, a CVD process or the like is evacuated by a vacuum pump. Further, the process chamber and exhaust apparatuses connected to the process chamber are cleaned periodically by supplying a cleaning gas thereto. Because exhaust gases such as the process gas, the cleaning gas or the like contain a silane-based gas ($SiH_4$, TEOS or the like), a halogen-based gas ($ClF_3$, HF, $F_2$, HCl, $Cl_2$ or the like), a PFC gas ($CF_4$, $C_2F_6$, $NF_3$, $SF_6$ or the like) or the like, such exhaust gases have negative effects on human bodies and on the global environment such as global warming. Therefore, it is not preferable that these exhaust gases are emitted to the atmosphere as they are. Accordingly, these exhaust gases are made harmless by an exhaust gas treatment apparatus provided at a downstream side of the vacuum pump, and the harmless exhaust gases are emitted to the atmosphere.

In a manufacturing process for manufacturing semiconductor devices, liquid crystal panels, LEDs, solar cells or the like, various process gases, a cleaning gas and the like are used. The exhaust gas treatment apparatus for treating exhaust gases such as various process gases and a cleaning gas, has the following problems.

(1) In the exhaust gas treatment apparatus for semiconductor manufacturing processes, for example, a combustion-type exhaust gas treatment apparatus, the number of the exhaust gas treatment apparatuses which can cope with exhaust gas treatment depending on gases and reactions used in the semiconductor manufacturing process has been determined. Then, specifications of the exhaust gas treatment apparatuses, which are customized to the amount and kinds of the gases to be introduced, have been prepared for respective customers and respective semiconductor manufacturing processes, and evaluation tests have been performed and then the exhaust gas treatment apparatus has been brought to the market. At that time, a combustion part, a cooling part, a powder collection part and the like have been designed respectively so that treatment performance of the exhaust gas treatment apparatus enables the concentration of the treated exhaust gas to be an allowable concentration or smaller. Further, the exhaust gas treatment apparatuses for a manufacturing process of semiconductor devices, liquid crystal panels or solar cells, differ in the amounts and kinds of gases to be introduced, and thus the exhaust gas treatment apparatuses have quite a few specifications. Therefore, the exhaust gas treatment apparatuses need to be designed, manufactured and evaluated, for respective customers and respective manufacturing processes, thus requiring a great deal of labor and increasing an apparatus cost.

(2) Recently, a large pump system which combines a plurality of booster pumps (BP) comprising a dry pump (DP) and a plurality of main pumps (MP) comprising a dry pump (DP) has been widely available on the market, and thus the exhaust gas treatment apparatus has an increased need to deal with a large amount of gas flow from such large pump system from now on. Further, an integrated-type system in which a dry pump (DP) and an exhaust gas treatment apparatus are packaged has been introduced into the market. However, such integrated-type system is designed each time to meet respective required specifications. Therefore, the design of the exhaust gas treatment apparatus has required considerable amounts of cost and time.

(3) Since the conventional exhaust gas treatment apparatus is large in size and needs to be installed fixedly on a base or a floor, the installation and setting up of the apparatus has been costly in the light of transportation, installation and the like, and has required a large amount of work time. Further, relocation of the exhaust gas treatment apparatus has also required comparable cost and work time. Furthermore, since the exhaust gas treatment apparatus is installed fixedly on the base or the floor, it has been necessary to repair a trouble of the apparatus on site and to shut down a process apparatus until the completion of repair of the apparatus.

(4) In the case where an exhaust gas is treated by a combination of a plurality of abatement types, there are a combination of a dry-type exhaust gas treatment apparatus and a combustion-type exhaust gas treatment apparatus, a combination of a wet-type exhaust gas treatment apparatus and the combustion-type exhaust gas treatment apparatus, and other combinations. Even in such combinations, individual exhaust gas treatment apparatuses have needed to be designed each time, so as to suit characteristics of the respective exhaust gas treatment apparatuses while being in consideration of the amount and kind of gases to be introduced. Further, even in the case where a plurality of exhaust gas treatment apparatuses are combined, the number of the exhaust gas treatment apparatuses is limited from the restriction of installation place and the cost. In order to meet the required treatment capacity, the exhaust gas treatment apparatuses have sometimes been designed to have excessive capacity. Further, in the case where the required treatment capacity has been changed due to a change in a manufacturing process, or in the case where the exhaust gas treatment apparatus has broken down, modification design, on-site modification work, or on-site repair work of the complex exhaust gas treatment apparatus has been required. In these cases, the process apparatus has been needed to be shut down during the on-site work. Furthermore, even in an attempt to change the type of the exhaust gas treatment, it has been difficult to replace the exhaust gas treatment apparatus actually because of its large size and expensiveness.

(5) In the exhaust gas treatment apparatus used in the manufacturing process, it is common to use a plurality of exhaust gas treatment apparatuses with respect to a plurality of process chambers. Since the exhaust gas treatment apparatus is large in size and expensive, a plurality of exhaust gas treatment apparatuses are required to beck up each other, thus requiring complex piping arrangement and complex mutual back-up systems. It is difficult to install a plurality of exhaust gas treatment apparatuses, for back-up, with respect to one process chamber in view of both cost and securing of installation place. Further, since maintenance cycles differ between the dry pump and the exhaust gas treatment apparatus, the process apparatus has required to be shut down each time the maintenance of each of them is performed.

(6) Conventionally, when the exhaust gas is treated by the combination of a plurality of abatement types, a controller for controlling the exhaust gas treatment apparatus is provided in each of the exhaust gas treatment apparatuses. Therefore, a connecting part (interface) is needed between each of the exhaust gas treatment apparatuses and a process apparatus, and thus the installation of the exhaust gas treatment apparatuses is costly and time-consuming.

SUMMARY OF THE INVENTION

It is therefore an object to provide a vacuum pump with abatement function, at a low cost and quickly, which has a small-sized and removable abatement part attached at a downstream side of the vacuum pump, and can meet a required abatement performance by altering the combination of kinds, the number and arrangement, of the attached abatement parts.

Embodiments, which will be described below, relate to a vacuum pump for use in an exhaust system of a manufacturing apparatus for manufacturing semiconductor devices, liquid crystal panels, LEDs, or the like, and more particularly to a vacuum pump with abatement function which comprises a vacuum pump, for evacuating a chamber of the manufacturing apparatus, to which an abatement function for treating an exhaust gas discharged from the chamber to make the exhaust gas harmless is added.

In order to achieve the above object, in an embodiment, there is provided a vacuum pump with abatement function comprising: a vacuum pump having a discharge port to which at least one abatement part for treating an exhaust gas discharged from the vacuum pump to make the exhaust gas harmless is attached; wherein the at least one abatement part is selected from a plurality of abatement parts having different treatment types of exhaust gas and/or different treatment amounts of exhaust gas and/or different treatment performances of exhaust gas.

According to the embodiment, even if a gas flow rate or the kind of the gas is changed or a required abatement treatment capacity is changed, by appropriately selecting the kind of the abatement part to be provided at a downstream side of the vacuum pump, it is not necessary to redesign each time, and consequently the exhaust gas treatment can be performed at a low cost.

In an embodiment, the abatement parts having different treatment types of exhaust gas comprise a combustion-type abatement part, a dry-type abatement part, a heater-type abatement part, a wet-type abatement part, a fluorine-fixing-type abatement part, a catalytic-type abatement part, a plasma-type abatement part, a filter-type abatement part, and a dilution-unit-type abatement part.

According to the embodiment, optimization of exhaust gas treatment or the required abatement performance can be achieved by preparing abatement parts having different treatment types.

In an embodiment, the at least one abatement part attached to the discharge port of the vacuum pump comprises a plurality of abatement parts which are arranged in series and/or in parallel.

According to the embodiment, the exhaust gas treatment in which a plurality of abatement types are combined can be realized by arranging the plurality of abatement parts in series and/or in parallel, and thus the optimization of exhaust gas treatment can be facilitated.

In an embodiment, the plurality of abatement parts are arranged in parallel to have back-up function of the abatement part.

According to the embodiment, by arranging the plurality of abatement parts in parallel, the back-up function can be provided in a simple way at a low cost, without employing separate back-up systems.

In an embodiment, the plurality of abatement parts arranged in parallel comprise abatement parts having the same treatment type and/or abatement parts having different treatment types.

According to the embodiment, the back-up function can be ensured while achieving the optimization of exhaust gas treatment.

In an embodiment, a controller configured to collectively control the vacuum pump and the abatement part is provided in the vacuum pump.

According to the embodiment, since the abatement part does not have a controller, the abatement part can be small in size, and an interface between the abatement part and the process apparatus is not necessary.

In an embodiment, the abatement part is removably attached to the discharge port of the vacuum pump or an outlet pipe of another abatement part so as to be replaceable.

According to the embodiment, since the abatement part can be attached and replaced easily, a change of the abatement type or a change of treatment capacity can be made quickly.

In an embodiment, the vacuum pump comprises a single vacuum pump or a plurality of vacuum pumps connected in series and/or in parallel.

The above-described embodiments offer the following advantages.

(1) Since the abatement part is provided at a downstream side of each vacuum pump, in accordance with a gas flow rate discharged from the vacuum pump and the kind of process gas to integrate the vacuum pump and the abatement part, by altering the combination of kinds, the number and arrangement, of the abatement parts to be provided at the downstream side of the vacuum pump, optimization of exhaust gas treatment or the required abatement performance can be achieved.

(2) Even if the gas flow rate or the kind of the process gas is changed, it is not necessary to redesign each time. Further, in order to meet the required abatement treatment capacity, it is not necessary to design an abatement part so as to have excessive capacity, and consequently the exhaust gas treatment can be performed at a low cost. Furthermore, since the vacuum pump is equipped with the abatement part fitted to the gas flow rate discharged from each vacuum pump, it is not necessary to develop an abatement apparatus suited for an increase of gas flow rate from a large pump system which combines a plurality of vacuum pumps.

(3) Since the abatement part is small in size and easily removable as a unit of the vacuum pump, setting up, relocation and replacement of the abatement part can be carried out at a low cost and in a short period of time. Further, when the abatement part breaks down, the abatement part can be brought back to the factory to be repaired, and thus on-site workload is lessened, and advanced repair, which is difficult to perform on site, can be performed.

(4) By replacing part of the plurally arranged abatement parts with another or other abatement parts which have different abatement types, exhaust gas treatment in which a plurality of abatement types are combined can be realized.

(5) By providing the minimum necessary combination of the abatement parts for each of the required treatment performances, specifications having excessive performances can be avoided, and thus the exhaust gas can be treated at a low initial cost and also at a low running cost.

(6) Even if the process is changed, only the replacement or addition of the abatement part, or modification of the arrangement of the abatement parts is sufficient to deal with such process change, and design modification, on-site modification work, or on-site renewal of the complex exhaust gas treatment apparatus is not required. Even if the required treatment capacity is changed, only the replacement or addition of the abatement part, or modification of the arrangement of the abatement parts is sufficient to deal with such change, and design modification, on-site modification work, or on-site renewal of the complex exhaust gas treatment apparatus is not required. Since the abatement part is small in size and inexpensive, by installing a plurality of abatement parts for a single process chamber, the back-up function can be provided in a simple way at a low cost.

(7) Since the abatement part does not require to be installed fixedly on the base or the floor, it can be easily replaced with a normal product. Therefore, an interruption of the process operation for the maintenance of the abatement part can be avoided.

(8) Since a controller is not provided in the abatement part, a conventional interface between a plurality of abatement apparatuses and the process apparatus is not required.

DETAILED DESCRIPTION OF EMBODIMENTS

A vacuum pump with abatement function according to embodiments will be described below with reference to FIGS. 1A through 8. In FIGS. 1A through 8, identical or corresponding parts are denoted by identical or corresponding reference numerals throughout views, and will not be described in duplication.

Figure 1A:
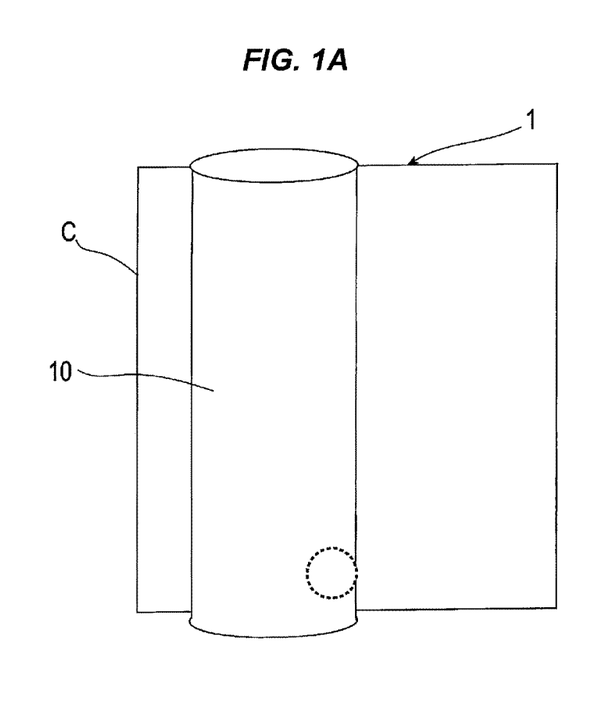
FIG. 1A is a schematic front elevational view showing a configuration example of a vacuum pump with abatement function according to an embodiment.
Figure 1B:
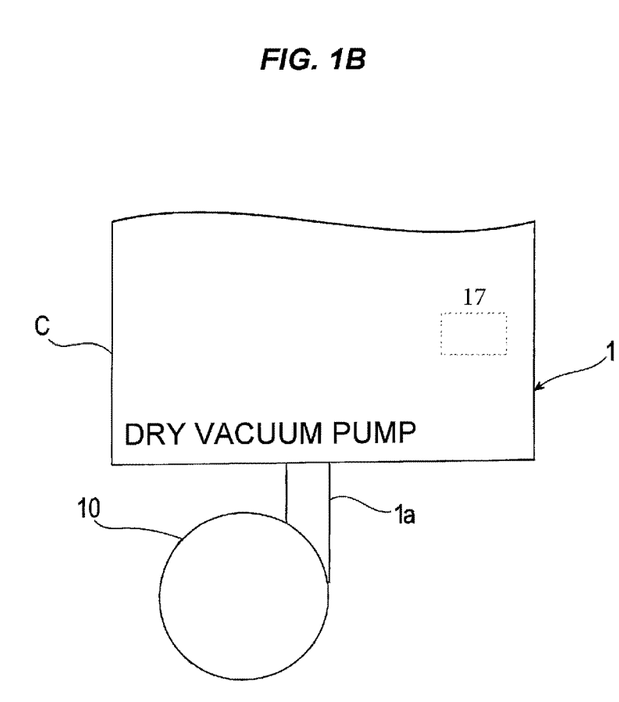
FIG. 1B is a schematic plan view of the vacuum pump shown in FIG. 1A.

FIGS. 1A and 1B are views showing a configuration example of a vacuum pump with abatement function according to an embodiment. FIG. 1A is a schematic front view of the vacuum pump with abatement function, and FIG. 1B is a schematic plan view of the vacuum pump with abatement function.

As shown in FIGS. 1A and 1B, a vacuum pump with abatement function according to the embodiment has a configuration wherein an abatement part 10 is attached to a discharge pipe 1a of a vacuum pump 1. The vacuum pump 1 may comprise a single dry vacuum pump or a plurality of dry vacuum pumps connected in series and/or in parallel. The single dry vacuum pump or the plural dry vacuum pumps comprise a roots-type dry vacuum pump, a screw-type dry vacuum pump, or the like, which is well known in the art and will not be shown and described in detail below. In FIGS. 1A and 1B, the vacuum pump 1 is illustrated as a vacuum pump having a housing C.

Figure 2A:
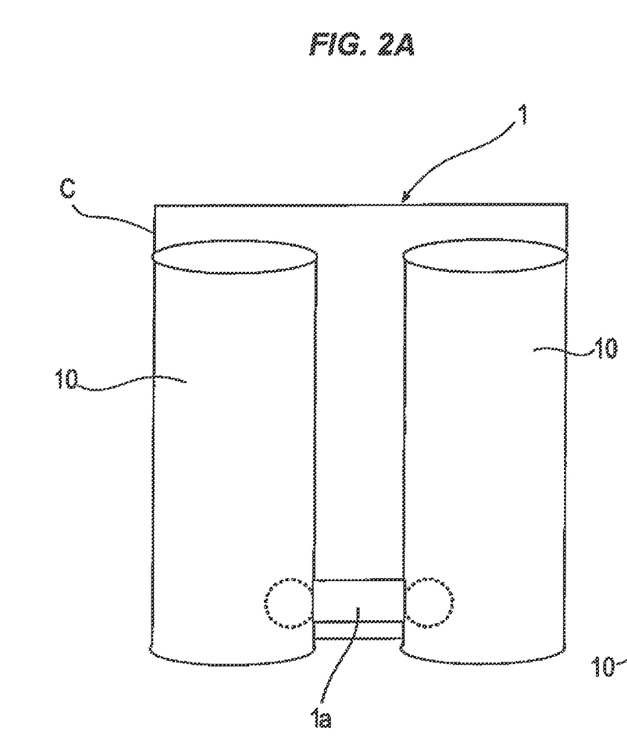
FIG. 2A is a schematic front elevational view showing another configuration example of a vacuum pump with abatement function according to the embodiment.
Figure 2B:
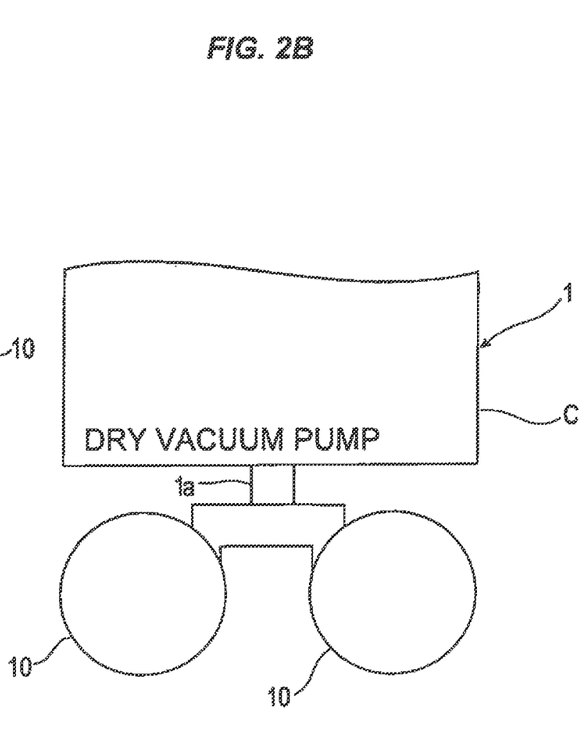
FIG. 2B is a schematic plan view of the vacuum pump shown in FIG. 2A.

FIGS. 2A and 2B are views showing another configuration example of a vacuum pump with abatement function according to the embodiment. FIG. 2A is a schematic front view of the vacuum pump with abatement function, and FIG. 2B is a schematic plan view of the vacuum pump with abatement function. As shown in FIGS. 2A and 2B, a vacuum pump with abatement function according to the embodiment has a configuration wherein two abatement parts 10, 10 are attached to respective portions branched from a discharge pipe 1a of the vacuum pump 1.

In FIGS. 1A and 1B and FIGS. 2A and 2B, the discharge pipe 1a which connects a discharge port of the vacuum pump 1 and a gas introduction port of the abatement part has a piping length of not more than 500 mm, specifically 200 mm to 400 mm.

The abatement part 10 of the vacuum pump with abatement function employs a combustion-type, a dry-type, a heater-type, a wet-type, a fluorine-fixing-type, a catalytic-type, a plasma-type, a filter-type, a dilution-unit-type (a blower, $N_2$ adding, air adding), or the like. In the embodiment, these plural kinds of the abatement parts 10 employing different treatment types of exhaust gas are prepared. Further, a plurality of abatement parts 10 having different treatment amounts of exhaust gas in each of the abatement parts 10 employing different treatment types of exhaust gas are prepared. Furthermore, a plurality of abatement parts 10 having different treatment performances of exhaust gas in each of the abatement parts 10 employing different treatment types are prepared. In the embodiment, an optimal abatement part 10 is selected, depending on the amount and kind of the exhaust gas discharged from the vacuum pump 1, from the plural kinds of abatement parts 10 employing different treatment types, and/or the plural abatement parts 10 having different treatment amounts of exhaust gas, and/or the plural abatement parts 10 having different treatment performances of exhaust gas, and the selected abatement part 10 is integrated with the vacuum pump 1.

Figure 3:
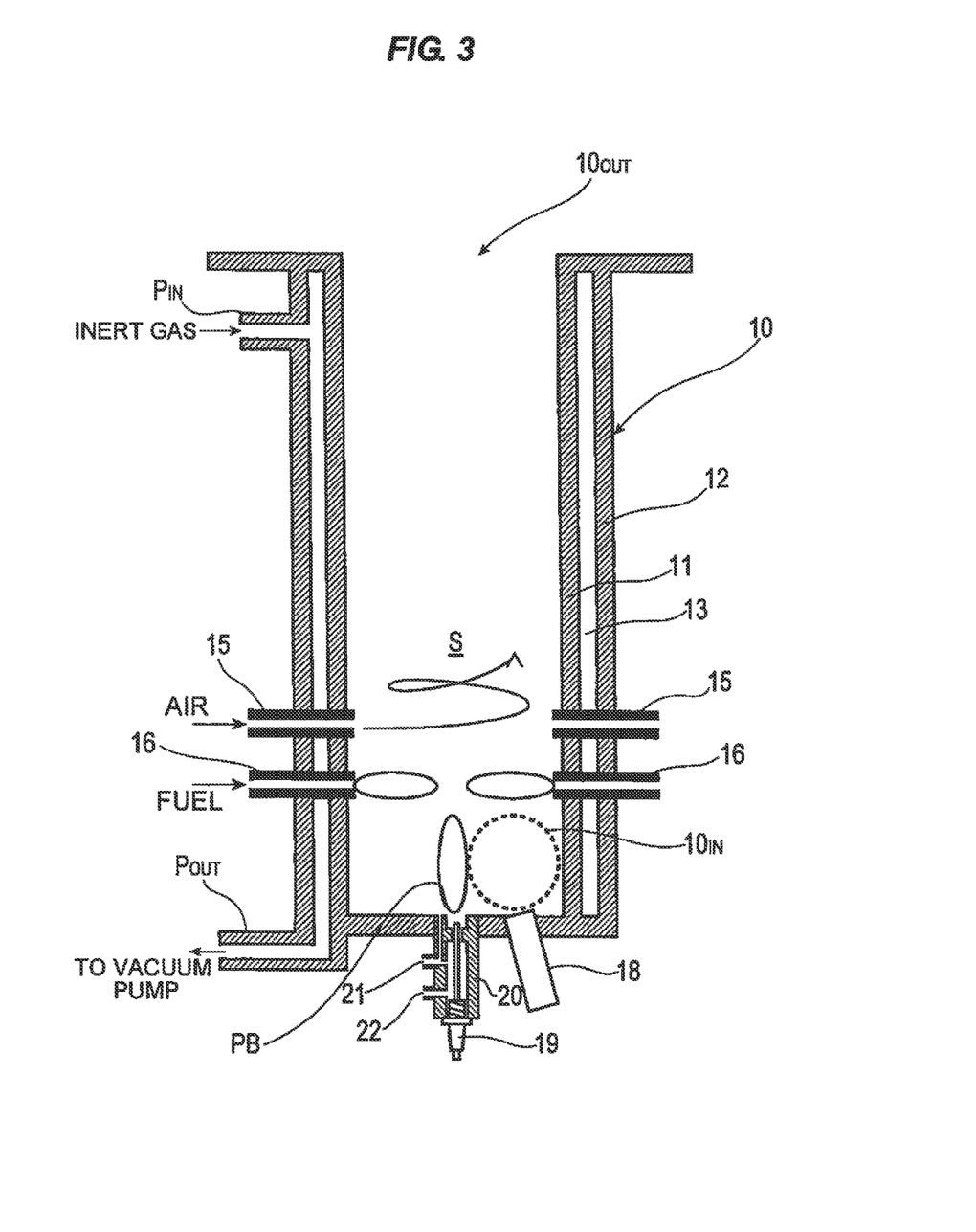
FIG. 3 is a cross-sectional view showing a configuration of an abatement part of the vacuum pump with abatement function.
Figure 4:
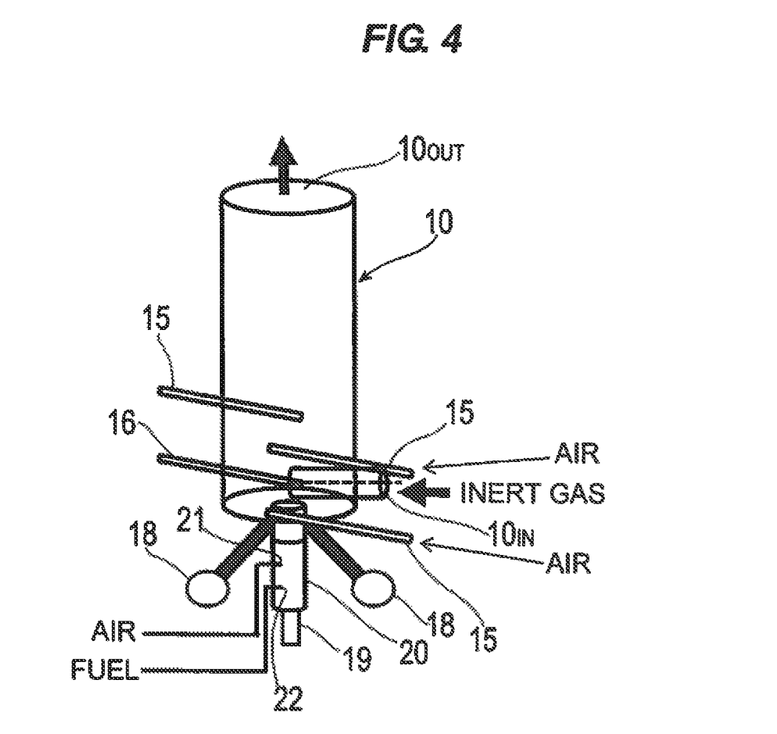
FIG. 4 is a schematic perspective view showing a configuration of an abatement part of the vacuum pump with abatement function.

FIGS. 3 and 4 are views showing a configuration of a combustion-type abatement part 10 as the abatement part of the vacuum pump with abatement function. FIG. 3 is a schematic cross-sectional view of the abatement part 10, and FIG. 4 is a schematic perspective view of the abatement part 10. As shown in FIGS. 3 and 4, the combustion-type abatement part 10 is composed of a cylindrical container as a whole.

The combustion-type abatement part 10 having a cylindrical container shape is disposed in a vertical direction so that its central axis extends in a vertical direction. As shown in FIG. 3, the combustion-type abatement part 10 comprises a cylindrical member 11 which has a bottom and forms a combustion chamber S therein for forming flames by a burner and combusting an exhaust gas, and an outer cylinder 12 provided so as to surround the cylindrical member 11 with a predetermined distance therebetween. A heating chamber 13 for holding and heating an inert gas such as an $N_2$ gas is formed between the cylindrical member 11 and the outer cylinder 12. The inert gas such as an $N_2$ gas flows into the heating chamber 13 from an inlet port $P_{IN}$ provided at an upper part of the outer cylinder 12 and is heated in the heating chamber 13, and flows out from an outlet port $P_{OUT}$ provided at a lower part of the outer cylinder 12. The heating chamber 13 having a double-pipe-structure constitutes a heat exchanger. The inert gas heated in the heating chamber 13 can be supplied to the vacuum pump 1. The inert gas is heated in the heating chamber 13 to a temperature which is substantially equal to an internal temperature of the vacuum pump 1, for example, to a temperature of 190° C. to 220° C.

As shown in FIGS. 3 and 4, a gas introduction port $10_{IN}$ for introducing the exhaust gas to be treated into the combustion chamber is formed at a lower part of a circumferential wall of the combustion-type abatement part 10. A gas outlet $10_{OUT}$ for discharging the gas after treatment is formed at the upper end of the abatement part 10. A plurality of air nozzles 15 for supplying air into the combustion chamber S and a plurality of fuel nozzles 16 for supplying a fuel into the combustion chamber S are provided in the abatement part 10. As shown in FIGS. 3 and 4, the air nozzles 15 extend at a predetermined angle to the tangential direction of the abatement part 10 to blow off air so as to form swirling flows along an inner circumferential surface of the circumferential wall of the cylindrical member 11. Similarly, the fuel nozzles 16 extend at a predetermined angle to the tangential direction of the cylindrical member 11 to blow off the fuel so as to form swirling flows along the inner circumferential surface of the circumferential wall of the cylindrical member 11. The air nozzles 15 and the fuel nozzles 16 are disposed respectively at predetermined intervals in the circumferential direction of the abatement part 10.

As shown in FIGS. 3 and 4, a UV sensor 18 for detecting flames and a plug 19 for ignition are provided on the bottom of the cylindrical member 11. A cylindrical pilot burner part 20 is provided so as to surround the plug 19. A fuel supply port 21 for supplying a fuel for forming a flame and an air supply port 22 for supplying air are formed in the pilot burner part 20. Thus, a pilot burner flame PB is formed by igniting the fuel supplied from the fuel supply port 21 with the plug 19.

Next, operation of the abatement part 10 shown in FIGS. 3 and 4 will be described.

The fuel is blown off from the plural fuel nozzles 16 provided in the abatement part 10 toward the combustion chamber S so as to form the swirling flows. Further, air is blown off from the plural air nozzles 15 toward the combustion chamber S so as to form the swirling flows. Then, the mixture gas of fuel and air is ignited by the pilot burner PB, and thus the swirling flows of flames (swirling flames) are formed along the inner circumferential surface of the cylindrical member 11.

On the other hand, the exhaust gas to be treated is blown off toward the combustion chamber S from the exhaust gas introduction port $10_{IN}$ which opens on the inner circumferential surface of the cylindrical member 11. The blown-off exhaust gas mixes with the swirling flames of the mixture gas and is combusted. At this time, because the fuel is blown off from all the fuel nozzles 16 provided in the circumferential direction of the cylindrical member 11 so as to swirl intensely in one direction, combustion efficiency of the exhaust gas becomes high. Further, since the air ejected from the air nozzles 15 is also swirling, while the air flows mix with the flames to accelerate the swirling flows of the flames, the exhaust gas is oxidatively decomposed. The treated gas is discharged from the gas outlet $10_{OUT}$ at the upper end of the abatement part 10, and is then discharged to an exhaust duct.

According to the embodiment, the exhaust gas discharged from the vacuum pump 1 has been heated by compression heat in the vacuum pump 1 to a temperature of about 200° C., and the heated exhaust gas is introduced from the discharge pipe 1a directly into the abatement part 10 wherein the exhaust gas can be treated to be made harmless by combustion. Therefore, it is not necessary to heat the exhaust gas from normal temperature, and an amount of fuel used in the abatement part 10 can be reduced, thus achieving energy saving. Since the exhaust gas heated to a temperature of about 200° C. flows through the discharge pipe 1a of the vacuum pump 1, it is not necessary to heat the discharge pipe 1a by a heater for piping. Therefore, it is not necessary to install the heater for piping and thus energy saving can be achieved. Further, since the discharge pipe 1a which connects the vacuum pump 1 and the abatement part 10 has a piping length of not more than 500 mm, the product can be prevented from being attached to the discharge pipe 1a.

Further, according to the embodiment, combustion waste heat generated by abatement treatment of the exhaust gas is utilized to heat the inert gas such as an $N_2$ in the heating chamber 13 of the abatement part 10, and the heated inert gas is supplied to the vacuum pump 1. Therefore, purging of the vacuum pump 1 can be performed by the heated inert gas, and thus a product can be prevented from being attached to the interior of the vacuum pump 1. According to the embodiment, it is not necessary to install a dedicated heater for heating the inert gas, thus achieving energy saving. The inert gas may be a gas which does not react with the contained gases, other than $N_2$. For example, the inert gas may be a noble gas such as He, Ar or Kr, or $CO_2$.

Figure 5:
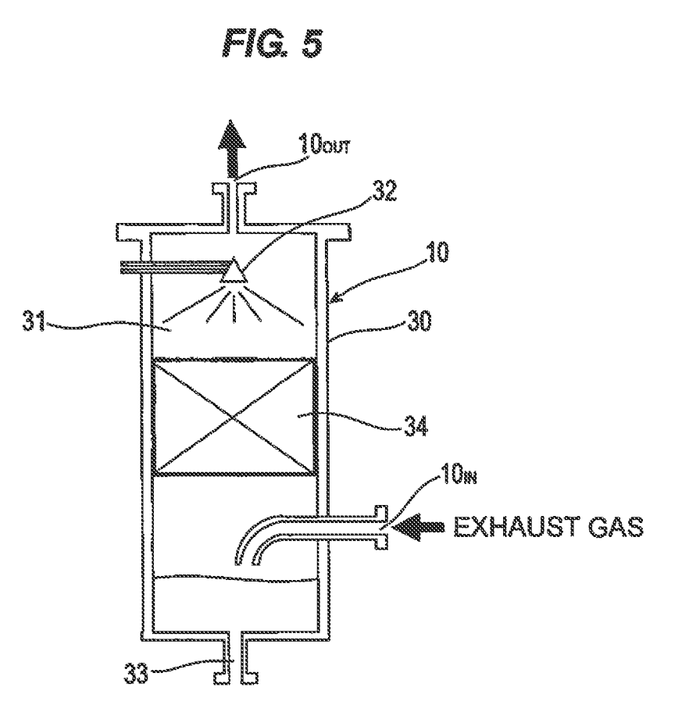
FIG. 5 is a schematic cross-sectional view showing a configuration of a wet-type abatement part as the abatement part of the vacuum pump with abatement function.

FIG. 5 is a schematic cross-sectional view showing a configuration of a wet-type abatement part 10 as the abatement part of the vacuum pump with abatement function. As shown in FIG. 5, the wet-type abatement part 10 comprises a treatment chamber body having a cylindrical container shape as a whole. A treatment chamber 31 is formed in the treatment chamber body 30. A gas introduction port $10_{IN}$ for introducing the exhaust gas to be treated into the treatment chamber is formed at a lower part of a circumferential wall of the treatment chamber body 30. A gas outlet $10_{OUT}$ for discharging the gas after treatment is formed at the upper end of the treatment chamber body 30. A water spray nozzle 32 for supplying water into the treatment chamber 31 is provided at an upper part of the treatment chamber 31. Fillers 34 for enhancing a contact efficiency between the water sprayed from the water spray nozzle 32 and the exhaust gas are provided below the spray nozzle 32. A discharge outlet 33 for discharging drainage water in which the exhaust gas is dissolved is provided at a bottom wall portion of the treatment chamber 31.

As shown in FIG. 5, the exhaust gas is introduced into the treatment chamber 31 from the gas introduction port $10_{IN}$. The water spray nozzle 32 sprays water, and the sprayed water passes through the fillers 34 and is then discharged from the discharge outlet 33. The exhaust gas introduced from the gas introduction port $10_{IN}$ is brought into contact with the water which has fallen from the fillers 34, and thus water-soluble components in the exhaust gas dissolve in the water. Further, the exhaust gas passes through the fillers 34 whose gas-liquid interface area is increased to improve the contact efficiency between the exhaust gas and the water, thereby dissolving water-soluble components which have not dissolved yet. The remaining components in the exhaust gas which still have not dissolved in the water are cleaned by the water sprayed from the water spray nozzle 32 disposed above the fillers 34. The treated gas is discharged from the gas outlet $10_{OUT}$. In this example, the fillers comprise raschig rings.

Figure 6:
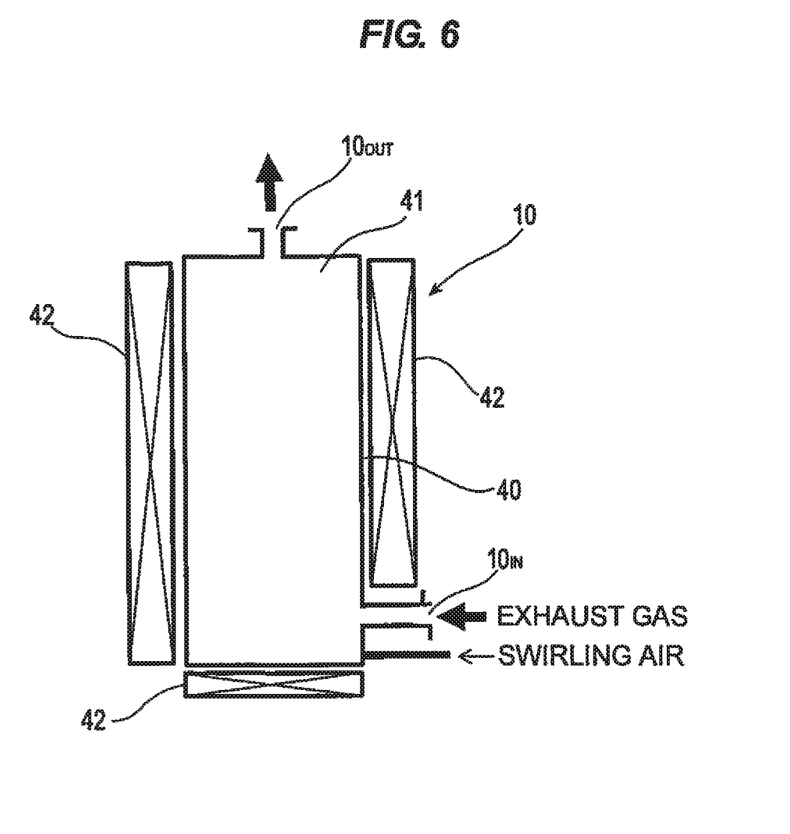
FIG. 6 is a schematic cross-sectional view showing a configuration of a heater-type abatement part as the abatement part of the vacuum pump with abatement function.

FIG. 6 is a schematic cross-sectional view showing a configuration of a heater-type abatement part 10 as the abatement part of the vacuum pump with abatement function. As shown in FIG. 6, the heater-type abatement part 10 comprises a treatment chamber body 40 having a cylindrical container shape as a whole. A treatment chamber 41 is formed in the treatment chamber body 40. Heaters 42 are provided around a circumferential wall and at the outer bottom portion, of the treatment chamber body 40. A gas introduction port $10_{IN}$ for introducing the exhaust gas to be treated into the treatment chamber is formed at a lower part of the circumferential wall of the treatment chamber body 40, and a gas outlet $10_{OUT}$ for discharging the gas after treatment is formed at the upper end of the treatment chamber body 40. Swirling air is supplied from a lower part of the circumferential wall of the treatment chamber body 40.

As shown in FIG. 6, the exhaust gas is introduced into the treatment chamber 41 from the gas introduction port $10_{IN}$. The exhaust gas introduced into the treatment chamber 41 is decomposed at a high temperature of approximately 500° C. to 1400° C. while being swirled by the swirling air. The treated gas is discharged from the gas outlet $10_{OUT}$.

Figure 7:
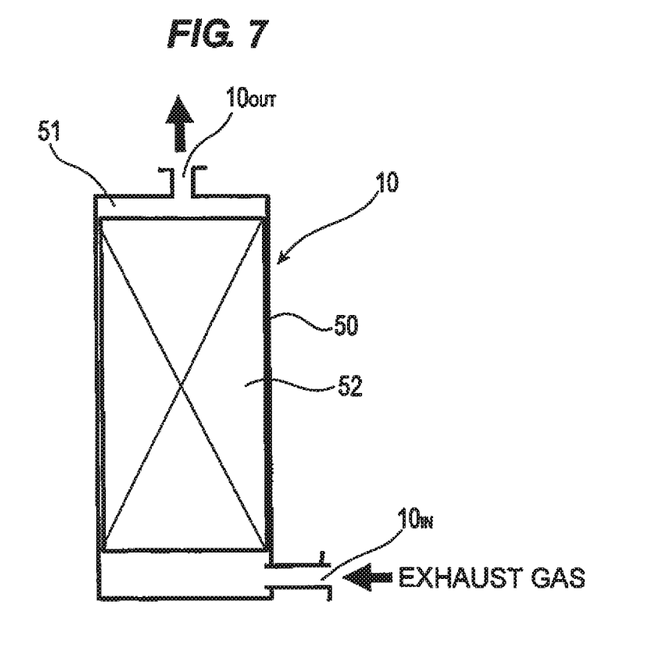
FIG. 7 is a schematic cross-sectional view showing a configuration of a dry-type abatement part as the abatement part of the vacuum pump with abatement function.

FIG. 7 is a schematic cross-sectional view showing a configuration of a dry-type abatement part 10 as the abatement part of the vacuum pump with abatement function. As shown in FIG. 7, the dry-type abatement part 10 comprises a treatment chamber body 50 having a cylindrical container shape as a whole. A treatment chamber 51 is formed in the treatment chamber body 50. A gas introduction port $10_{IN}$ for introducing the exhaust gas to be treated into the treatment chamber is formed at a lower part of a circumferential wall of the treatment chamber body 50, and a gas outlet $10_{OUT}$ for discharging the gas after treatment is formed at the upper end of the abatement portion 10. The treatment chamber 51 is filled with treatment agent (chemical agent) 52 to adsorb the exhaust gas. The treatment agent comprises metal oxides, zeolites, ion-exchange resins, alkaline agents, noble metal catalysts, activated carbons, or the like. A heater may be provided at an outer circumference of the treatment chamber 51 to heat the treatment agent (chemical agent).

Figure 8:
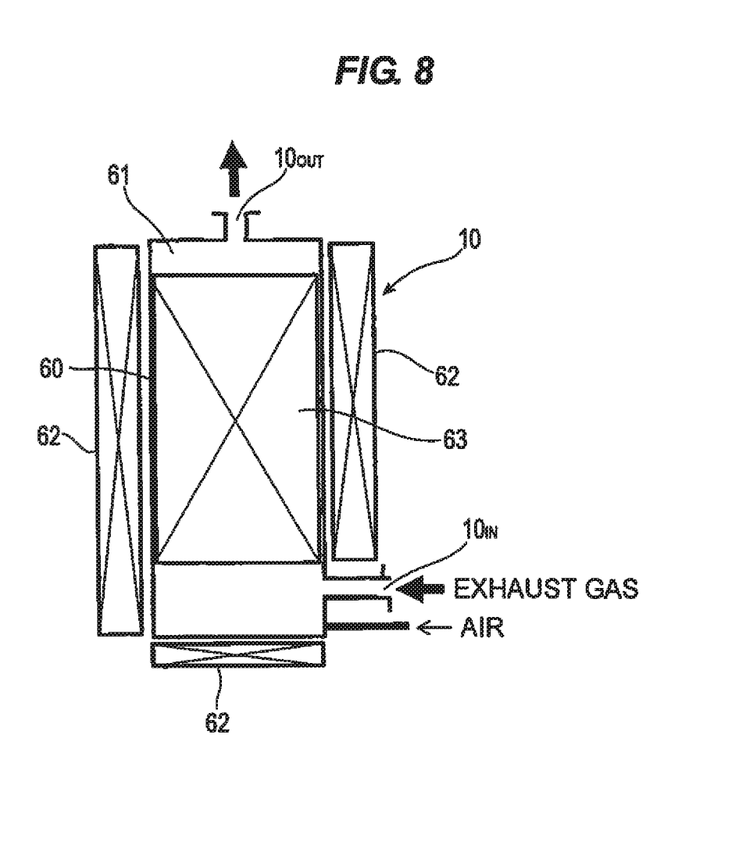
FIG. 8 is a schematic cross-sectional view showing a configuration of a fluorine-fixing-type abatement part as the abatement part of the vacuum pump with abatement function.

FIG. 8 is a schematic cross-sectional view showing a configuration of a fluorine-fixing-type abatement part 10 as the abatement pert of the vacuum pump with abatement function. As shown in FIG. 8, the fluorine-fixing-type abatement part 10 comprises a treatment chamber body 60 having a cylindrical container shape as a whole. A treatment chamber 61 is formed in the treatment chamber body 60. The fluorine-fixing-type abatement part 10 has heaters 62 around a circumferential wall and at the outer bottom portion, of the treatment chamber 61. A gas introduction port $10_{IN}$ for introducing the exhaust gas to be treated into the treatment chamber is formed at a lower part of the circumferential wall of the treatment chamber body 60, and a gas outlet $10_{OUT}$ for discharging the gas after treatment is formed at the upper end of the treatment chamber body 60.

The treatment chamber 61 is filled with fixing chemical agent 63 to fix F (fluorine) components. A mixed agent, which comprises metal components having high decomposition ability of the exhaust gas and metal components for fixing the decomposed F (fluorine) components, is used as the fixing chemical agent. Thus, PFC gases ($CF_4$, $C_2F_6$, $NF_3$, $SF_6$ or the like) generated from the process apparatus and F (fluorine) components contained in by-product gas such as $SiF_4$ are fixed to the fixing chemical agent.

According to an embodiment, the abatement part is provided at a downstream side of each vacuum pump, in accordance with a gas flow rate discharged from the vacuum pump and the kinds of process gases, thereby integrating the vacuum pump and the abatement part. By altering the combination of kinds, the number and arrangement, of the abatement parts to be provided at the downstream side of the vacuum pump, optimization of exhaust gas treatment can be achieved and such combination can meet the required abatement performance.

Specifically, conventional cases, such as an abatement apparatus in which a dry-type and a combustion-type are combined or an abatement apparatus in which a wet-type and a combustion-type are combined, where abatement apparatuses are customized to fit gas flow rates and the kinds of process gases, result in a wide variety of specifications for abatement apparatuses. On the other hand, in the embodiment, the optimization of exhaust gas treatment can be achieved simply by altering the combination of kinds, the number and arrangement (in series, in parallel, or combination thereof), of the abatement parts. Therefore, even if the gas flow rate or the kind of the process gas is changed, it is not necessary to redesign each time. Further, in order to meet the required abatement treatment capacity, it is not necessary to design an abatement part so as to have excessive capacity. Consequently, the exhaust gas can be treated at a low cost. Furthermore, since the vacuum pump is equipped with the abatement part fitted to the gas flow rate discharged from each vacuum pump, it is not necessary to develop an abatement apparatus suited for an increase of gas flow rate from a large pump system.

For example, in the case where $SiH_4$ gas is treated, if it is demanded to lower a gas concentration to an allowable concentration or less and also to prevent an outflow of powder, a dry-type abatement part filled with metal oxides should be used. Alternatively, a wet-type abatement part for removing powder, such as a fan scrubber, may be provided at a downstream side of the combustion-type abatement part. With this configuration, $SiH_4$ is oxidized into $SiO_2$ (powder) by the combustion-type abatement part, and then $SiO_2$ is removed by the subsequent-stage wet-type abatement part. If the outflow of powder does not matter, only the combustion-type abatement part may be used.

If the whole gas flow rate increases, the gas treatment performance of the abatement part is lowered. However, the gas treatment performance can be tailored simply by increasing the number of the dry-type abatement parts when using the dry-type abatement parts, or by increasing the number of the combustion-type abatement parts or by replacing the existing abatement part (parts) with a fuel-rich abatement part (parts) when using the combustion-type. The fuel-rich abatement part is a combustion-type abatement part in which a flow rate of fuel to be used for combustion is increased; it includes a combustion-type abatement part in which diameters of piping are enlarged to increase the flow rates of utilities such as a fuel and air, a combustion-type abatement part in which the number of nozzles is increased, and a combustion-type abatement part having a flow rate regulating mechanism for a high flow rate. Further, a lowering of the gas treatment performance of the abatement part caused by an increase of the gas flow rate can be prevented by using an abatement part employing a different kind of fuel.

In this manner, the required various treatment performances can be obtained simply by altering the combination of the abatement parts.

Since the abatement part is small in size and easily removable as a unit of a vacuum pump, setting up and relocation of the abatement part can be carried out at a low cost and in a short period of time.

Since the abatement part is not installed fixedly on a base or a floor, when being in need of replacement, the abatement part can be easily replaced by means of clamp coupling or the like. Further, when the abatement part breaks down, the abatement part can be replaced with a normal product without being repaired on site. Accordingly, the shutdown time of the process apparatus can be shortened. Furthermore, when the abatement part breaks down, the abatement part can be brought back to the factory to be repaired, and thus on-site workload is lessened, and advanced repair, which is difficult to perform on site, can be performed.

According to one embodiment, a plurality of abatement parts which are arranged in series, in parallel, or combination thereof, are provided at a downstream side of the vacuum pump.

The kinds of the abatement part include a combustion-type, a dry-type, a heater-type, a wet-type, a fluorine-fixing-type, a catalytic-type, a plasma-type, a filter-type, and a dilution-unit-type (a blower, $N_2$ adding, air adding).

By replacing part of the plurally arranged abatement parts with another or other abatement parts which have different abatement types, exhaust gas treatment in which a plurality of abatement types are combined can be realized.

Conventionally, in the case of the combustion-type abatement apparatuses, the respective abatement apparatuses have been designed such that fuel flow rates have been different depending on the gas flow rates to be introduced. Further, an expensive mass flow controller (MFC) has been used so as to be able to change the amount of the fuel even in a single abatement apparatus.

On the other hand, according to the embodiment, a plurality of abatement parts which have different fuel flow rates are prepared, and the plural abatement parts are combined in series or in parallel in accordance with the gas flow rate to be introduced into the abatement parts. Thus, the optimal exhaust gas treatment can be realized at a low cost. Further, it is not necessary to use the expensive mass flow controller (MFC) or the like. Furthermore, heat generated by the combustion-type abatement part can be reutilized, for example, to heat an $N_2$ gas for the vacuum pump.

Conventionally, in the case of the dry-type abatement apparatuses, filler compositions of chemical agents for the dry-type columns have been changed depending on respective processes. Therefore, in order to achieve the optimization of exhaust gas treatment, a large variety of dry-type columns have needed to be prepared. In addition, the changes of filler compositions have needed to bring back the dry-type columns to the factory each time, and to replace the chemical agents therein.

On the other hand, according to the embodiment, the preceding and/or subsequent abatement parts of the plural abatement parts can be easily replaced with an abatement part (parts) filled with other kind (kinds) of chemical agent, and thus the optimization of exhaust gas treatment to exhaust gases generated from different processes can be achieved.

Further, by replacing the abatement part on-site, the compositions of the chemical agent can be changed quickly. By changing the kind of chemical agent, a noble gas may be purified and recycled. Further, Pd catalyst is used for $H_2$ treatment to generate heat, which can be reused, for example, to heat $N_2$ gas for the vacuum pump.

Conventionally, in the case of the heater-type abatement apparatuses, abatement apparatuses having different beater capacities with respect to respective gas flow rates to be introduced have needed to be prepared.

On the other hand, according to the embodiment, since plural kinds of beater-type abatement parts having respectively different beater capacities are prepared and arranged depending on a gas flow rate to be introduced, in series, in parallel or in combination thereof the abatement part does not need to be designed to have excessive heater capacity, but the optimal abatement part which fits with the gas flow rate to be introduced can be provided at a low cost.

Further, by providing the catalytic-type abatement part or the fluorine-fixing-type abatement part at a downstream side of the beater-type abatement part, treatment of PFC gases ($CF_4$, $C_2F_6$, $NF_3$, $SF_6$ or the like) and fluorine-fixing can be performed. Furthermore, heat generated in the heater-type abatement part can be reused, for example, to heat $N_2$ gas for the vacuum pump.

According to the embodiment, by providing the minimum necessary combination of the abatement parts for each of the required treatment performances, specifications having excessive performances can be avoided, and thus the exhaust gas can be treated at a low initial cost and also at a low running cost.

For example, the combustion-type abatement apparatus or the heater-type abatement apparatus incorporates a water-scrubber for treating acidic gases and powder. However, since the water-scrubber is incorporated as a package of the apparatus, it has been difficult to design only the water-scrubber each time to increase or decrease the treatment performance depending on the required treatment performance.

On the other hand, according to the embodiment, by providing a lineup of plural wet-type abatement parts having different treatment performances, the required gas treatment can be realized by installing a wet-type abatement part which fits the required treatment performance at a downstream side of the combustion-type abatement part or the heater-type abatement part, without the need for designing each time.

Even if the process is changed, only the replacement or addition of the abatement part, or modification of the arrangement of the abatement parts is sufficient to deal with such process change, and design modification, on-site modification work, or on-site renewal of the complex exhaust gas treatment apparatus is not required.

For example, in the case where $NF_3$ has been treated by the heater-type abatement part, if $NF_3$ is changed to $CF_4$ due to a process change, $CF_4$ cannot be treated by the heater-type abatement part. In this case, $CF_4$ can be treated by adding the fluorine-fixing-type abatement part at the downstream side of the heater-type abatement part. Alternatively, $CF_4$ can be treated by replacing the heater-type abatement part with the combustion-type abatement part.

Even if the required treatment capacity is changed, only the replacement or addition of the abatement part, or modification of the arrangement of the abatement parts is sufficient to deal with such change, sad design modification, on-site modification work, or on-site renewal of the complex exhaust gas treatment apparatus is not required.

For example, if the combustion-type abatement part is demanded to improve the treatment capacity of acid gases, the acid gases can be treated by adding the wet-type abatement part at the downstream side of the combustion-type abatement part. Further, if the combustion-type abatement part is demanded to improve the treatment performance of by-product powder, the powder can be treated by adding the wet-type abatement part or filter-type abatement part for removing the powder at the downstream side of the combustion-type abatement part.

Since the abatement part is small in size and inexpensive, if required to be replaced with another type of abatement part, only the replacement of the existing abatement part with another type of abatement part is sufficient. The design modification of the complex abatement apparatus and the replacement of the large and expensive abatement apparatus are not required, and thus the abatement type can be changed easily.

According to one embodiment, a plurality of abatement parts are provided in parallel at an immediately downstream side of the vacuum pump, thereby providing back-up function of the abatement part.

Since the abatement part is small in size and inexpensive, by installing a plurality of abatement pats for a single process chamber, the back-up function can be provided in a simple way at a low cost. The back-up function may be provided by connecting the same type of abatement parts in parallel, or by connecting the different types of abatement parts in parallel. A dry-type abatement part can be easily placed for the back-up of the combustion-type abatement part.

Since the abatement pert does not require to be installed fixedly on the base or the floor, it can be easily replaced with a normal product. If replacement of the abatement part is needed, a line is bypassed to the back-up abatement part, and the abatement part to be replaced is removed by means of the clamp coupling or the like. Thus, the abatement part can be replaced without shutdown of the process operation. In this manner, an interruption of the process operation for the maintenance of the abatement part can be avoided.

An overhaul of an exhaust system including the abatement part can be performed concurrently with an overhaul of the vacuum pump, thus shortening shutdown time of the process.

According to one embodiment, the control of the respective abatement parts is performed by a controller 17 of the vacuum pump 1. Specifically, the control of the abatement parts is incorporated in the controller of the vacuum pump to allow the abatement parts not to have a controller. Alternatively, a dedicated controller for controlling the plural abatement parts is provided.

With such configuration, a conventional interface between a plurality of abatement apparatuses and the process apparatus is not required.

According to one embodiment, two or more abatement parts are selected from the plural abatement parts, and are then combined into one package. For example, the combination of the combustion-type abatement part and the wet-type abatement part, the combination of the heater-type abatement part and the wet-type abatement part, and the combination of the wet-type abatement part, the heater-column-type abatement part and the wet-type abatement part are packaged, respectively. The packaged combination of the abatement parts can serve as an apparatus which corresponds to the combustion-type exhaust treatment apparatus, the thermo-oxidative-decomposition-type exhaust treatment apparatus, or the catalytic-type exhaust treatment apparatus, which has been installed fixedly on a base or a floor, and also as a product to meet the treatment capacity of the required specification.

Although the preferred embodiments of the present invention have been described above, it should be understood that the present invention is not limited to the above embodiments, but various changes and modifications may be made to the embodiments without departing from the scope of the appended claims.

What is claimed is:

1. A vacuum pump system with abatement function comprising:
   a vacuum pump having a discharge port to which at least one abatement part for treating an exhaust gas discharged from the vacuum pump to make the exhaust gas harmless is directly attached, the at least one abatement part comprising a container attached to the discharge port of the vacuum pump and configured to treat the exhaust gas therein;
   wherein the at least one abatement part is selected from a plurality of abatement parts having different treatment types of exhaust gas and/or different treatment amounts of exhaust gas and/or different treatment performances of exhaust gas for lowering the concentration of the exhaust gas, the selected abatement part being integrated with the vacuum pump;
   a controller configured to collectively control the vacuum pump and the at least one abatement part is provided in the vacuum pump;
   the vacuum pump comprises a dry vacuum pump configured to heat the exhaust gas by compression heat, the heated exhaust gas discharged from the discharge port of the vacuum pump being introduced into the at least one abatement part wherein heat of the heated exhaust gas is utilized to treat the exhaust gas;
   wherein the container of the at least one abatement part comprises a cylindrical member which forms a combustion chamber therein for combusting the exhaust gas, an outer cylinder provided so as to surround the cylindrical member, and a heating chamber formed between the cylindrical member and the outer cylinder and configured to hold and heat an inert gas, whereby heat generated by combustion of the exhaust gas in the combustion chamber is utilized to heat the inert gas held in the heating chamber, and the heated inert gas is supplied to the dry vacuum pump.

2. The vacuum pump system with abatement function according to claim 1, wherein the at least one abatement part attached to the discharge port of the vacuum pump comprises a plurality of abatement parts which are arranged in series and/or in parallel.

3. The vacuum pump system with abatement function according to claim 2, wherein the plurality of abatement parts are arranged in parallel.

4. The vacuum pump system with abatement function according to claim 3, wherein the plurality of abatement parts arranged in parallel comprise abatement parts having the same treatment type and/or abatement parts having different treatment types.

5. The vacuum pump system with abatement function according to claim 1, wherein the at least one abatement part is removably attached to the discharge port of the vacuum pump or an outlet pipe of another abatement part so as to be replaceable.

6. The vacuum pump system with abatement function according to claim 1, wherein the vacuum pump comprises a single vacuum pump or a plurality of vacuum pumps connected in series and/or in parallel.

7. The vacuum pump system with abatement function according to claim 3, wherein at least one of the plurality of abatement parts provides a back-up function to another one of the plurality of abatement parts.

* * * * *